United States Patent [19]

Rak

[11] Patent Number: 4,970,003

[45] Date of Patent: Nov. 13, 1990

[54] WATER SOFTENING PROCESS WITH PRESERVICE RINSE

[75] Inventor: Stanley F. Rak, Mundelein, Ill.

[73] Assignee: Culligan International Company, Northbrook, Ill.

[21] Appl. No.: 464,383

[22] Filed: Jan. 12, 1990

[51] Int. Cl.$^5$ ............... C02F 1/42; B01D 24/48
[52] U.S. Cl. ................... 210/673; 210/742; 210/140; 210/269
[58] Field of Search ............... 210/269, 670, 673, 138, 210/139, 140, 142, 739, 742

[56] References Cited

U.S. PATENT DOCUMENTS

| | | | |
|---|---|---|---|
| 1,794,765 | 3/1931 | Green | 210/269 |
| 1,834,387 | 12/1931 | Dotterweich | 210/269 |
| 2,744,868 | 5/1956 | Harting | 210/269 |
| 3,002,922 | 10/1961 | Baddour | 210/269 |
| 3,003,638 | 10/1961 | Kryzer et al. | 210/269 |
| 3,058,816 | 10/1962 | Rudelick | 210/269 |
| 3,101,316 | 8/1963 | Rose | 210/670 |
| 3,208,934 | 9/1965 | Kingsbury | 210/269 |
| 3,989,624 | 11/1976 | Wachsmuth | 210/269 |
| 4,104,158 | 8/1978 | Davis | 210/670 |
| 4,104,165 | 8/1978 | Braswell | 210/673 |
| 4,133,759 | 1/1979 | Ikeda et al. | 210/138 |
| 4,154,677 | 5/1979 | Mantell | 210/138 |
| 4,181,605 | 1/1980 | Braswell | 210/673 |
| 4,228,000 | 10/1980 | Hoeschler | 210/673 |
| 4,237,538 | 12/1980 | LaDall | 210/670 |
| 4,385,357 | 5/1983 | Davis et al. | 210/670 |
| 4,394,262 | 7/1983 | Bukowski et al. | 210/138 |
| 4,536,845 | 8/1985 | DeVale et al. | 210/140 |
| 4,668,402 | 5/1987 | Norton | 210/140 |
| 4,704,202 | 11/1987 | Poyner | 210/138 |
| 4,722,797 | 2/1988 | Gauer et al. | 210/670 |
| 4,764,280 | 8/1988 | Brown et al. | 210/673 |
| 4,849,111 | 7/1989 | Abrams | 210/673 |

Primary Examiner—Richard V. Fisher
Assistant Examiner—Cynthia L. Nessler
Attorney, Agent, or Firm—Gerstman & Ellis, Ltd.

[57] ABSTRACT

A water softening system is provided including a service step, a regenerating step and a rinse step. The service step includes introducing relatively hard water into the inlet, through an ion exchange resin and out the outlet to a service location. The regenerating step includes introducing a brine solution into the inlet, through the resin and out the outlet to drain. Prior to the service step, an automatic rinse step is provided by which an amount of the relatively hard water is introduced into the inlet, through the softening medium and out of the outlet to drain.

6 Claims, 1 Drawing Sheet

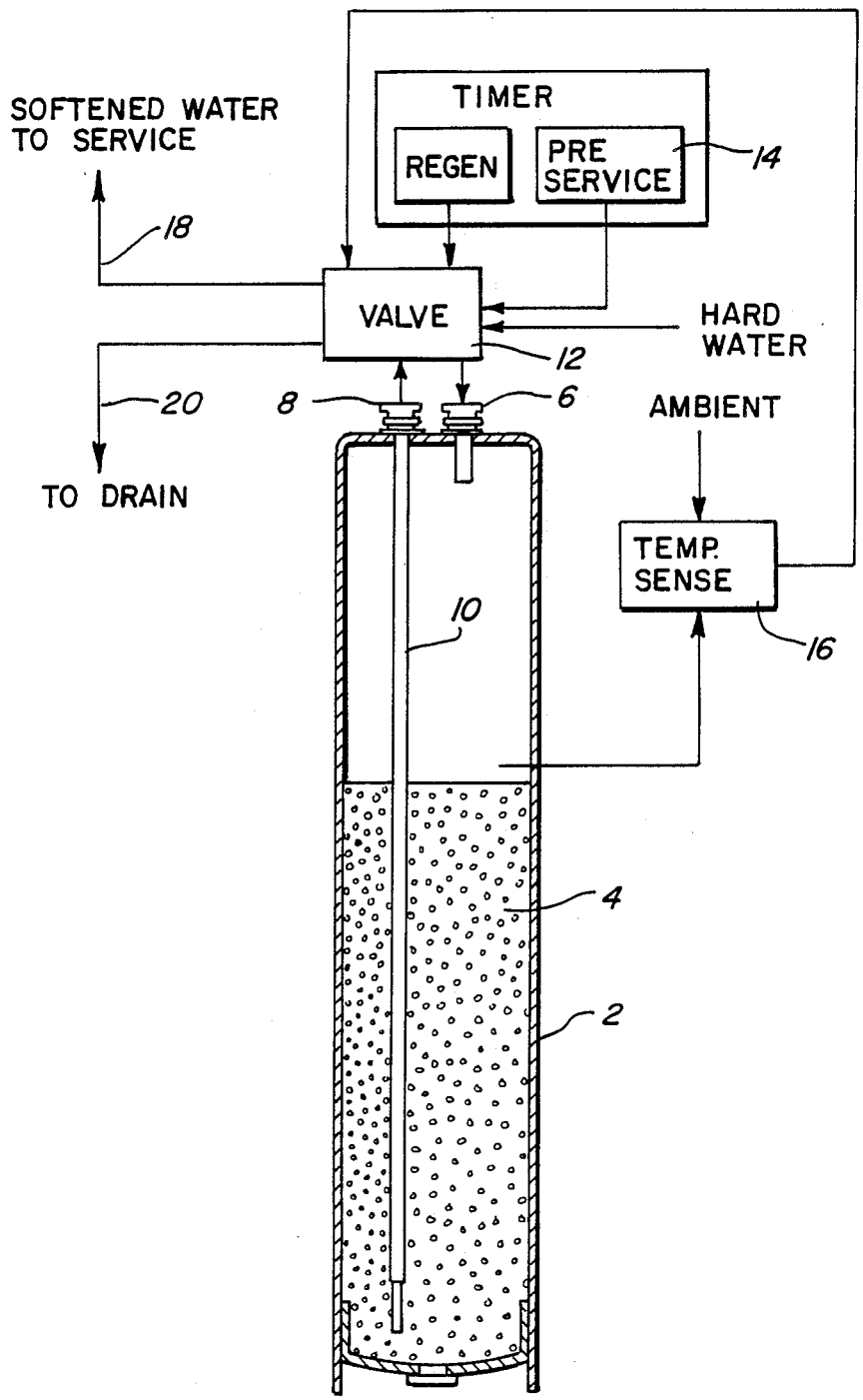

WATER SOFTENING PROCESS WITH PRESERVICE RINSE

FIELD OF THE INVENTION

The present invention concerns a novel water softening system.

BACKGROUND OF THE INVENTION

In areas where hard Water is present, water softeners are frequently used. Typically, a water softening tank contains an ion exchange resin. During water service, fresh, relatively hard water is introduced into the inlet, passed through the ion exchange resin, and it exits via the outlet to a service location. Occasionally the ion exchange resin must be regenerated. To this end, a brine solution is introduced into the inlet, it flows through the ion exchange resin and exits the outlet from which it is pumped to drain. When the regeneration is completed, a valve switches the outlet line to service.

If the water softener has not been used for a certain amount of time, the possibility of a contamination problem exists. For example, in a water softener that is inactive, contaminants may build up in the resin. Further, as a result of the water in the softener tank being stagnate for a certain amount of time, the stagnate water may become contaminated. If the ion exchange resin is contaminated or if the water in the softener tank is contaminated, the initial amount of service water that flows may also be contaminated. It is, therefore, an object of the invention to provide a water softening system in which the contamination problem is alleviated.

Other objects and advantages of the present invention will become apparent as the description proceeds.

SUMMARY OF THE INVENTION

In accordance with the present invention, a water softening process is provided in which the water softener has an inlet, a softening medium and an outlet. The process comprises the providing of service by introducing relatively hard water into the inlet, through the softening medium and out the outlet to a service location. The softening medium is regenerated at various intervals by introducing a regenerating medium into the inlet, through the softening medium and out the outlet to drain. Prior to the service step, a rinse step is provided which comprises the step of introducing an amount of the relatively hard water into the inlet, through the softening medium and out the outlet to drain.

In the illustrative embodiment, the regenerating medium comprises a brine solution and the softening medium comprises an ion exchange resin.

In one embodiment of the invention, a determination is made as to the length of time that the softener has not been used for service. The rinse step is provided only if the softener has not been used for a predetermined time period.

In another form of the invention, the rinse step is timed so that it occurs at a predetermined time of the day.

In another form of the invention, the temperature differential between the ambient air and the water present in the softener is sensed. The rinse step is provided only if the temperature differential between the ambient air and the water present in the softener is less than a predetermined amount.

A more detailed explanation of the invention is provided in the following description and claims, and is illustrated in the accompanying drawing.

BRIEF DESCRIPTION OF THE DRAWING

The drawing shows the water softening system in diagrammatic form.

DETAILED DESCRIPTION OF THE ILLUSTRATIVE EMBODIMENT

Referring to the drawing, a water softening tank 2 is shown therein containing a bed of ion exchange resin 4. The tank comprises an inlet 6 and an outlet 8 having a conduit 10 extending downward and through the ion exchange resin 4 to a lower portion of tank 2.

A valve 12 is coupled to outlet 8 and is controlled by a timer 14 and/or a temperature differential sensor 16. Timer 14 includes a regeneration step setting, and a preservice (rinse) setting. Valve 12 directs the outlet water either to service via line 18 or to drain via line 20. When the timer is in its regeneration mode or is in its preservice (rinse) mode, the valve is operated to direct the outlet water to drain. Likewise, when the temperature differential sensor 16 senses a temperature differential between the ambient air and the water that is within the softener tank 2 that varies by less than a predetermined differential, valve 12 will operate to direct the outlet water to drain. At other times, valve 12 directs the outlet water to service.

During the service step, the fresh, relatively hard water is introduced via valve 12 to inlet 6, flows through ion exchange resin 4, through conduit 10 and to outlet 8. Valve 12 is set to direct the outlet water via line 18 to service. Periodically, at a time when water service is not customary, timer 14 operates to place the valve in its regeneration mode. When in the regeneration mode, brine solution is introduced into inlet 6 and the valve 12 switches the flow of the outlet water to drain.

To backwash the system, the valve 12 is actuated to provide flow of the hard water directly into outlet 8, through resin 4, and out of inlet 6, to drain.

In order to alleviate contamination that has possibly built up due to inactivity of the softener, resulting in stagnant water and/or contaminant build-up in the ion exchange resin, a preservice or initial rinse step is provided. To this end, prior to service the fresh inlet water is directed through the ion exchange resin and to drain.

In one form of the invention, timer 14 operates to provide a preservice rinse at a predetermined time or times of the day. For example, if service is ordinarily required at 6:00 a.m. each day, timer 14 may provide a preservice rinse at 5:30 a.m. each day. As a specific example although no limitation is intended, the rinse could comprise one to two bed volumes of rinse water.

In another form, a combination flow switch and timer is provided. If the flow switch has been inactive for a predetermined amount of time, this indicates that the softener has been inactive and the rinse step will proceed prior to valve 12 switching to its service mode.

In another form, temperature differential 16 is used to sense the difference in the temperature between the ambient air and the water that is within the softener tank. If the water contained in the tank is at approximately ambient air temperature, it will be determined that the softener has been inactive for a certain time and, valve 12 will provide an automatic rinse cycle prior to switching to its service cycle once a faucet is opened for service.

A determination concerning the temperature of the water within the tank can be made with a temperature sensor that is in heat exchange with the outside of the tank, thereby obviating the need to position a temperature sensor directly inside of the tank.

Although illustrative embodiments of the invention have been described, it is to be understood that various modifications and substitutions may be made by those skilled in the art without departing from the novel spirit and scope of the present invention.

I claim:

1. A water softening process, comprising the steps of:
   providing a water softener having an inlet, a softening medium, and an outlet;
   providing service by introducing fresh water into the inlet, through the softening medium and out the outlet to a service location;
   regenerating the softening medium at various intervals by introducing a regenerating medium into the inlet, through the softening medium and out the outlet to drain;
   prior to the service step, providing a rinse step comprising the step of introducing an amount of the fresh water into the inlet, through the softening medium and out the outlet to drain;
   providing a flow switch and timer, and determining by the inactivity of the flow switch over a period of time that there has been no flow for a predetermined period of time, and providing the rinse step only if there has been no flow for a predetermined period of time.

2. A water softening process, comprising the steps of:
   providing a water softener having an inlet, a softening medium, and an outlet;
   providing service by introducing fresh water into the inlet, through the softening medium and out the outlet to a service location;
   regenerating the softening medium at various intervals by introducing a regenerating medium into the inlet, through the softening medium and out the outlet to drain;
   prior to the service step, providing a rinse step comprising the step of introducing an amount of the fresh water into the inlet, through the softening medium and out the outlet to drain;
   sensing the temperature differential between the ambient air and the water present in the softener, and providing the rinse step only if the temperature differential is less than a predetermined amount.

3. A water softening process, comprising the steps of:
   providing a water softener having an inlet, a softening medium, and an outlet;
   providing service by introducing fresh water into the inlet, through the softening medium and out the outlet to a service location;
   regenerating the softening medium at various intervals by introducing a regenerating medium into the inlet, through the softening medium and out the outlet to drain;
   after a prolonged period of idleness is automatically determined, automatically providing an initial rinse step comprising the step of introducing an amount of the fresh water into the inlet, through the softening medium and out the outlet to drain.

4. A water softening process as defined in claim 3, in which the regenerating medium comprises a brine solution and the softening medium comprises an ion exchange resin.

5. A water softening process as defined by claim 3, including the step of timing the rinse step so that it occurs at a predetermined time of the day.

6. A water softening process as defined by claim 3, including the steps of sensing the temperature differential between the ambient air and the water present in the softener, and providing the rinse step only if the temperature differential is less than a predetermined amount.

* * * * *